Nov. 1, 1938.   G. W. BILLING   2,135,027
MANUFACTURE OR PRODUCTION OF MATERIAL AND GARMENTS
THEREFROM FOR BATHING AND SWIMMING
Filed June 4, 1937   2 Sheets-Sheet 1
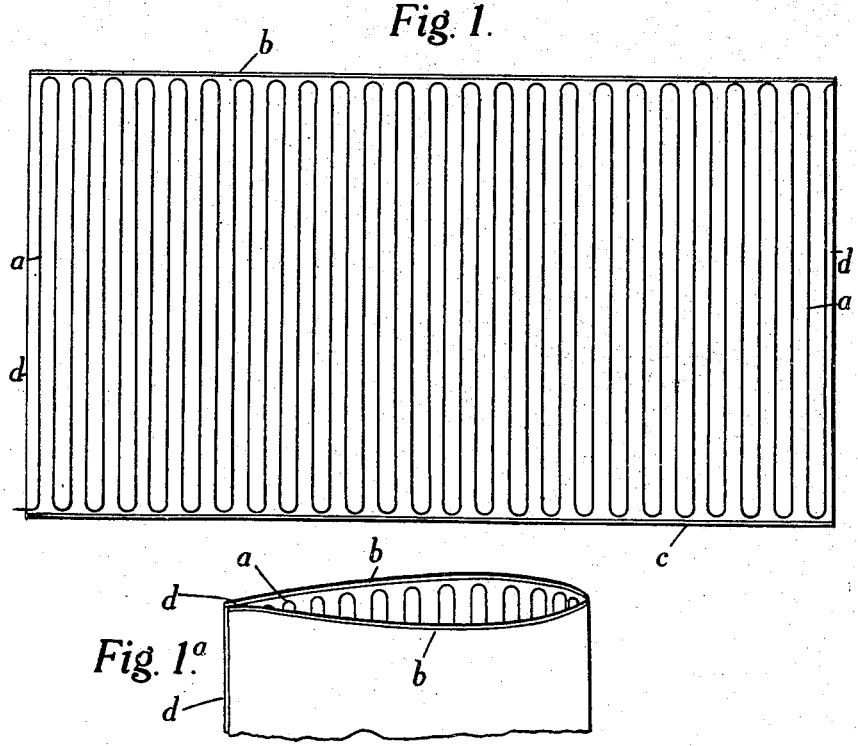
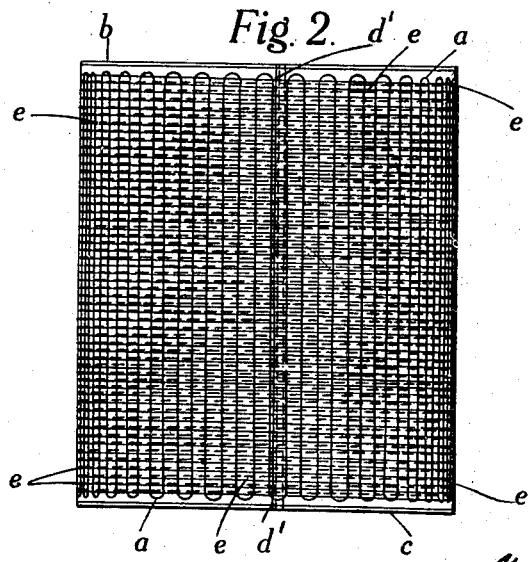

Nov. 1, 1938.  G. W. BILLING  2,135,027
MANUFACTURE OR PRODUCTION OF MATERIAL AND GARMENTS
THEREFROM FOR BATHING AND SWIMMING
Filed June 4, 1937  2 Sheets-Sheet 2
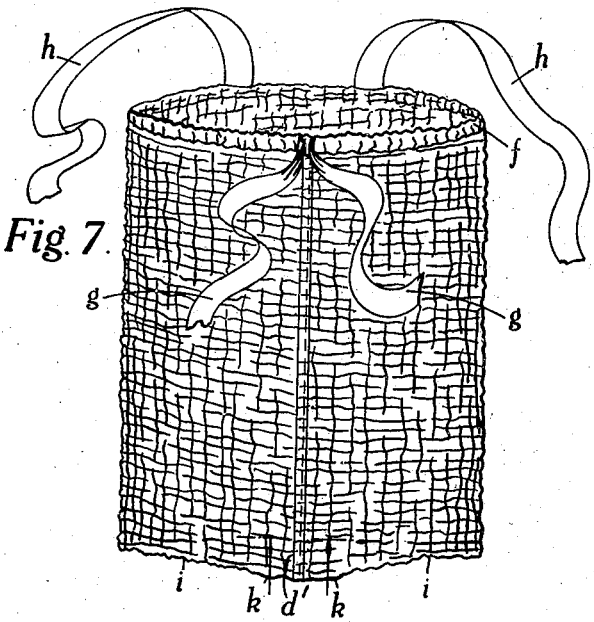
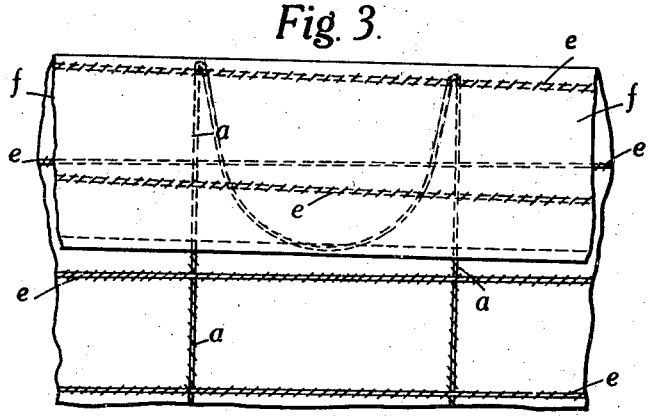
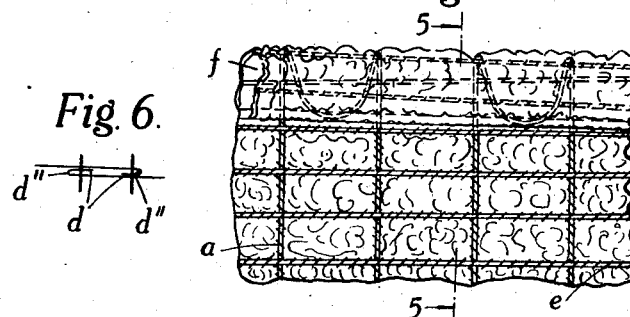
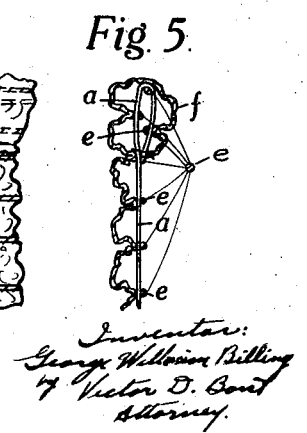

UNITED STATES PATENT OFFICE 2,135,027

MANUFACTURE OR PRODUCTION OF MATERIAL AND GARMENTS THEREFROM FOR BATHING AND SWIMMING

George William Billing, Market Harborough, England, assignor to R. & W. H. Symington & Company Limited, Market Harborough, England, a company of England Application June 4, 1937, Serial No. 146,408
In Great Britain March 30, 1937

4 Claims. (Cl. 2—243)

This invention has reference to garments particularly, though not exclusively, intended for the use of bathers or swimmers and relates to the kind in which the material whereof they are constructed is characterized by being puckered or gathered and rendered elastic or stretchable and flexible as the result of application, in the course of its manufacture, to the basic material comprised therein, by stitching or the like, of strands or threads of rubber or elastic which follow the warp and weft thereof in continuous zig-zag manner, the material being rendered in tubular form by folding the same and stitching the cut edge together through the superposed selvedges.

According to the present invention, a piece of the basic material, of suitable size, has strands or threads of rubber or elastic run or stitched transversely therein or thereto from selvedge to selvedge at a suitable or required gauge, the running of the strands being arranged in zig-zag order with the bends occurring at alternate selvedges. In this condition, the material is folded approximately in half with the selvedges lying upon themselves or in superposed relation and the raw or cut edges of the material are stitched together so as to form a tubular structure, the seaming being accomplished by what is known as a lap seam. In this tubular form, the selvedges assume positions at top and bottom and the material is provided with a continuous and spirally run length of the strand or length of rubber thread the running being in intersecting relation with the aforesaid transversely run rubber or elastic strands or threads.

As the result of this method of applying the rubber or elastic element of the material, the seam is almost of invisible nature while the risk of slipping or similar displacement of neighbouring strands or threads of the rubber or elastic is avoided and the production of the material expedited and facilitated.

The size of the piece of the basic material hereinbefore referred to, it will be understood, is such as to serve in the production of a single garment by manipulation thereof in a manner which will readily suggest itself to those engaged in the manufacture of the kind of articles to which the invention relates. In this connection, however, it may be mentioned that the bottom of the garment may be fashioned so as to provide a centrally positioned piece adapted for residing in the fork or crotch of the wearer and laterally disposed openings for the passage of the legs while the top is provided with a draw-string or tape and shoulder straps adapted for association with the aforesaid draw-string.

In order that the invention may be readily understood and carried into effect same will now be more fully described with reference to the accompanying drawings, in which:—

Figure 1 is a diagrammatic view in plan of a piece of basic material having the selvedges top and bottom and the rubber or elastic stitching in zig-zag formation from selvedge to selvedge.

Figure 1a is a fractional view of the piece folded.

Figure 2 is a view of the same piece of the basic material showing the same in tubular formation, having the raw edges lap seamed and the spirally applied intersecting rubber or elastic stitching associated with the stitching shown in Figure 1.

Figure 3 is a fractional view showing a portion of the inner side of the top of the material together with the hem for the passage of the draw-string, the material being stitched.

Figure 4 represents a normal or more restful condition of the material and showing the latter puckered or gathered in contradistinction to the showing in Figure 3.

Figure 5 shows a diagrammatic vertical section taken along the line 5—5 in Figure 4.

Figure 6 is a transverse section illustrating the lap seam whereby the raw edges of the piece of basic material are joined together.

Figure 7 is an elevational view of the completed garment.

Referring first to Figure 1, the piece of basic material represented thereby is provided with a running of elastic or rubber thread $a$ extending in zig-zag formation from the respective selvedges $b$, $c$, the bends in the zig-zag being secured in the said selvedges and the ends of the elastic thread passing out at and secured in the raw edges at the respective ends of the said piece. This piece so provided with the rubber or elastic thread $a$ is now folded (see Figure 1a) so that the selvedge $b$ forms the top of a hollow cylindrical or tubular structure indicated in Figure 2, the raw edges $d$, $d$, Figure 1a being secured by means of a lap seam as indicated at $d'$ (Figures 2 and 6). This tubular form of the basic piece is now provided with a length of rubber or elastic thread which is run in the form of a continuous spiral and in intersecting relation to the continuously run zig-zag thread $a$, such spirally run thread being indicated by the reference $e$.

It will be observed that the seam $d'$ appears, in Figure 2, centrally of the front of the tubular structure but its position is not confined thereto as it may be placed at the side or back. As shown, however, its position is found convenient in that it enables the outlets of the hem *f* with which the top of the garment is provided to serve as a runner or channel for the draw-string *g* (see Figure 7). The general effect of the application of the zig-zag and spirally run threads of elastic or rubber as above described will be apparent from an inspection of the enlarged and stretched fractional representations of the material as shown in the Figures 3, 4, and 5, the first of which, 3, depicts the strained condition thereof with the material actually flat, the second, 4, with the material in partially puckered or gathered condition and the third, 5, a sectional view corresponding with Figure 4. The character of the aforesaid lap seam *d'* will be clearly appreciated by referring to Figure 6 which represents an enlarged transverse section of the seam, *d, d* indicating the raw edges of the basic material and *d", d"* the folded portion usually associated with the system of hemming.

As previously stated, the seam is rendered of almost invisible character and the rubber or elastic owing to the method of stitching the same to the basic material ensures non-slipping in respect thereof. The puckering or gathering of the material as the result of the stitching of the elastic threads thereto produces a very pleasant effect when the material fully covered with the pattern is employed the mottled appearance is rendered quite pleasingly.

Owing to the described method of procedure in the production of the garments much time is saved so that the manufacture is expedited and facilitated with corresponding economy in cost.

*h, h* indicate shoulder straps which may be used by the wearer of the garment in association with the draw-string *g* as will readily be understood by wearers of garments of the kind involved in the present invention, *i, i* indicate openings for the passage of the legs and *k, k* a connected part of the back and front for engagement in or occupation of the fork or crotch whereby the leg openings are provided. The fashioning of the bottom for the purpose just mentioned will, however, be readily understood by those acquainted with the production of garments of the character of the invention.

It will be readily apparent that the size of the piece of basic material will vary as regards garments of different sizes to meet the requirements of wearers of varying heights and stoutness or otherwise, the said piece serving in the production of an article for human wear by manipulation as the makers of such garments will readily understand.

Mention may, however, be made herein that, ordinarily, the piece has the dimensions of sixty-six inches long by thirty-six inches wide, the selvedges occupying the longer sides thereof so that, when folded and the ends lap-seamed with the selvedges are at the top and bottom of the garment, the upper in the hem which is occupied by the draw-string and the lower serving to add strength to the leg openings and the crotch connecting piece.

What I claim is:—

1. The manufacture of a garment for bathers, swimmers and other wearers which consists in taking a suitably dimensioned piece of material having selvedge and unselvedged edges, applying strands or threads of rubber or elastic by stitching the same transversely thereto from selvedge to selvedge so that the running thereof is in zig-zag order with the bends occuring alternately in respect to the selvedges then folding the so-prepared piece of material and securing the raw edges thereof by means of a lap seam so as to produce a tubular structure and then stitching in a continuous spiral a further running of rubber or elastic threads in intersecting relation to the zig-zag run rubber or elastic strands or threads hereinbefore previously described.

2. An elastic material having selvedged and unselvedged edges for bathing garments and the like formed in tubular form by uniting the unselvedge edges in a lap seam and including stitched warp and weft directed strands of elastic material, the warp-run strands forming a continuous zig-zag from selvedge to selvedge and the weft-run strands forming a continuous spiral from end to end of the material and being in intersecting relation with the warp-run strands, and the elastic strands being under tension in the expanded material, whereby the material has normally a puckered character.

3. A garment for bathing and the like the material of which has selvedged and unselvedged edges and formed in tubular form by uniting the unselvedge edges in a lap seam and including stitched warp and weft directed strands of elastic material, the warp-run strands forming a continuous zig-zag from selvedge to selvedge and the weft-run strands forming a continuous spiral from end to end of the garment and being in intersecting relation with the warp-run strands, one of the selvedge edges being folded over and forming a hem at the upper edge having openings, a draw string within the hem and the ends thereof extending through the openings, and shoulder-straps extending from the front of the garment and adapted for joint operation with the draw string.

4. A garment for bathing and the like formed from a fabric having selvedged and unselvedged edges and arranged in tubular form by uniting the unselvedge edges in a lap seam running longitudinally of the back of the garment and including warp and weft directed strands of elastic material interwoven to effect a gathered effect in the garment, the warp-run strands forming a continuous zig-zag from selvedge to selvedge and the weft-run strands forming a continuous spiral from end to end of the garment and being in intersecting relation with the warp-run strands, a hem formed at the upper end of the garment having openings at the rear for a draw string, a draw string within the hem and the ends thereof extending through the openings in the hem, the lower edge of the garment being united centrally to engage the crotch of the wearer, and shoulder-straps extending from the front of the garment and adapted for connection to the draw string.

GEORGE WILLIAM BILLING.